(12) United States Patent
Stephan

(10) Patent No.: US 8,180,594 B2
(45) Date of Patent: May 15, 2012

(54) SYSTEM AND METHOD FOR AUTOMATED CUSTOMIZABLE ERROR DIAGNOSTICS

(75) Inventor: Robin A. Stephan, PJ Almere (NL)

(73) Assignee: ASM International, N.V. (NL)

( * ) Notice: Subject to any disclaimer, the term of this patent is extended or adjusted under 35 U.S.C. 154(b) by 656 days.

(21) Appl. No.: 11/850,941

(22) Filed: Sep. 6, 2007

(65) Prior Publication Data

US 2009/0070634 A1 Mar. 12, 2009

(51) Int. Cl.
*G06F 19/00* (2011.01)
*G06F 11/30* (2006.01)

(52) U.S. Cl. .......... 702/184; 702/183; 700/121

(58) Field of Classification Search .......... 700/8, 9, 700/19, 20, 78, 108–110, 112, 113, 121, 700/213, 228; 702/81, 84, 182–185; 714/25, 714/46–48, 100; 438/14
See application file for complete search history.

(56) References Cited

U.S. PATENT DOCUMENTS

| | | | | |
|---|---|---|---|---|
| 4,846,928 A * | 7/1989 | Dolins et al. | .......... | 438/16 |
| 4,861,419 A * | 8/1989 | Flinchbaugh et al. | .......... | 438/14 |
| 5,014,217 A * | 5/1991 | Savage | .......... | 702/28 |
| 5,410,495 A * | 4/1995 | Ramamurthi | .......... | 702/100 |
| 5,642,296 A * | 6/1997 | Saxena | .......... | 702/84 |
| 6,123,983 A * | 9/2000 | Smith et al. | .......... | 700/110 |
| 6,632,068 B2 | 10/2003 | Zinger et al. | | |
| 6,663,332 B1 | 12/2003 | Sluijk et al. | | |
| 6,684,122 B1 * | 1/2004 | Christian et al. | .......... | 700/121 |
| 6,719,499 B1 | 4/2004 | Kuznetsor et al. | | |
| 6,732,006 B2 * | 5/2004 | Haanstra et al. | .......... | 700/121 |
| 6,782,343 B2 | 8/2004 | Hasper | | |
| 6,788,991 B2 | 9/2004 | De Haas et al. | | |
| 6,889,149 B2 * | 5/2005 | Siegers et al. | .......... | 702/84 |
| 6,909,993 B2 * | 6/2005 | Nakao et al. | .......... | 702/185 |
| 6,937,963 B2 * | 8/2005 | Ishii et al. | .......... | 700/121 |
| 6,985,788 B2 | 1/2006 | Haanstra et al. | | |
| 7,008,802 B2 | 3/2006 | Lu | | |
| 7,133,807 B2 * | 11/2006 | Karasawa | .......... | 702/188 |
| 7,165,011 B1 * | 1/2007 | Kaushal et al. | .......... | 702/182 |
| 7,202,491 B2 | 4/2007 | Garssen et al. | | |
| 7,302,363 B2 * | 11/2007 | Kaushal et al. | .......... | 702/183 |
| 7,324,855 B2 * | 1/2008 | Ushiku et al. | .......... | 700/108 |
| 7,340,377 B2 * | 3/2008 | Kaushal et al. | .......... | 702/185 |
| 7,444,572 B2 * | 10/2008 | Kaushal et al. | .......... | 702/182 |
| 7,519,885 B2 * | 4/2009 | Kaushal et al. | .......... | 700/110 |
| 7,526,699 B2 * | 4/2009 | Kaushal et al. | .......... | 700/108 |
| 2003/0180125 A1 * | 9/2003 | van den Berg et al. | ........ | 414/172 |
| 2004/0073405 A1 * | 4/2004 | Karasawa | .......... | 702/188 |
| 2005/0075748 A1 * | 4/2005 | Gartland et al. | .......... | 700/108 |
| 2006/0064188 A1 * | 3/2006 | Ushiku et al. | .......... | 700/96 |
| 2007/0179751 A1 * | 8/2007 | Karasawa | .......... | 702/188 |

* cited by examiner

*Primary Examiner* — Charles Kasenge
(74) *Attorney, Agent, or Firm* — Knobbe, Martens, Olson & Bear LLP

(57) ABSTRACT

A system and method of automated customizable error diagnostics is provided for use with industrial apparatus, such as semiconductor manufacturing apparatus. An external device, such as a robot, is provided with its own low level controller and a high level controller is provided to send instructions to the low level controller. The high level controller is programmed to perform automated customizable error diagnostics to diagnose errors in the external device. The high level controller monitors the occurrence of error conditions in the external device and executes a list of diagnostic commands based upon a detected error condition. Data concerning the error condition is automatically gathered to diagnose the cause of the error, before the external device executes its own error handling routines. In some embodiments, an editor is provided to edit and customize the diagnostic commands and a viewer is provided to allow diagnostic data to be viewed.

25 Claims, 6 Drawing Sheets

SYSTEM AND METHOD FOR AUTOMATED CUSTOMIZABLE ERROR DIAGNOSTICS

BACKGROUND OF THE INVENTION

1. Field of the Invention

The invention relates to the field of control of industrial apparatus and, more specifically, to error diagnostics in case of an error condition.

2. Description of the Related Art

In an industrial apparatus such as processing equipment, and more particularly in semiconductor and wafer processing equipment, many sensors and actuators are incorporated to sense conditions and execute desired actions. The sensors and actuators are connected to a system controller. Examples of sensors include: temperature sensors, position sensors, pressure sensors, and gas flow sensors. Examples of actuators include: gas valves, pneumatic valves, mass flow controllers, and a thyristor package for firing a heating element. In general, multiple system controllers can be integrated with the processing equipment, each system controller having a certain field of responsibility, such as (i) a temperature controller, taking care of all functions relating to temperature, (ii) a process controller taking care of all functions relating to gas flow, pressure, gas valves etc., and (iii) a motion controller taking care of all functions relating to movement of actuators. In many cases, devices are integrated that have some level of complexity and therefore have their own controller. Such a device controller is then connected to one of the system controllers. Typically, such a device is purchased from a third party supplier, and therefore such devices will be referred to herein generally as "external devices." Examples include robots for performing motions, such as a wafer handling robot or a cassette handling robot, metrology tools integrated within the processing tool for measuring, e.g., film thickness or surface particle counts, and more complex sensors, such as a sensor for measuring gas concentrations of particular gases (e.g., oxygen or toxic gases).

Typically, the interface between the external device controller and the system controller to which it is connected is an interface designed for normal operation of the processing equipment. The communication enabled by this interface typically supports all functions needed in normal operation. The software of the system controller can be developed such that all normal operation functions of the external device can only be performed when the tool is in such a condition that the function can be executed in a safe manner. This is particularly important in the case of robots, where movements of the robots may cause damage when executed in an unsafe system condition. Examples of such unsafe system conditions include situations where sensors have indicated a wafer is not positioned where expected. Thus, the external device can enter into an error condition.

Often the cause of error conditions, such as motion errors, is not entirely clear and additional information is needed to diagnose and resolve the problem. Usually, this additional information is collected by a field service engineer. For this purpose, the field service engineer generally disconnects the controller of the external device from the system controller to which it is connected and connects a laptop computer directly to the controller of the external device. This procedure entails various drawbacks.

The laptop typically comprises software for diagnostics. Diagnostics commands are typically typed in manually or manually selected from a list of available commands. This takes considerable time.

Furthermore, as the external device is now disconnected from the system controller, the system controller does not check if a command can be executed safely. The safe operation of the diagnostic commands depends largely on the judgment of the individual field service engineer and is prone to human errors.

Another hurdle is that the industrial equipment is generally placed in areas with restricted access, such as clean rooms. Often it is not allowed to enter a laptop computer into such restricted areas or, when allowed, all communication ports on the laptop are sealed off. Special permissions might be required to enter into such a restricted area with a laptop that can be connected to the controller of the external device, causing further delays and equipment downtime. Furthermore, when the field service engineer is finally present at the tool with the error condition, the system has most likely already been brought to a stopped state. The controller of the external device might have, either automatically or by operator intervention, been aborted and internal variables in the registers of the controller might have been cleared, so that a proper diagnostics cannot be made anymore.

It is an objective of the present invention to avoid the problems described above. Accordingly, systems and a method for automated customizable error diagnostics of an error condition in an industrial apparatus are provided.

SUMMARY OF SOME EMBODIMENTS

In accordance with some embodiments of the invention, a method of semiconductor manufacturing is provided. The method comprises providing a reactor system having a system controller configured to control an external device controller. The external device controller is configured to control an associated external device. Monitoring for an error condition signal from the external device is performed. Instructions from the system controller to the external device controller are automatically transmitted to execute diagnostic functions corresponding to the error condition upon detection of the error condition. Diagnostic data from the external device is automatically gathered after transmitting the instructions.

In accordance with other embodiments of the invention, a method for semiconductor manufacturing is provided. A semiconductor process tool with an associated controller is provided. The associated controller is programmed to execute error handling routines after detecting an error condition in the process tool. A higher level controller in communication with the associated controller is provided. The higher level controller is configured to control the process tool by transmitting instructions to the associated controller. Diagnostic commands from the higher level controller are provided to the associated controller after detecting an error condition in the process tool. Diagnostic data is collected. The error handling routines of the associated controller are subsequently executed.

In accordance with yet other embodiments of the invention, a reactor system for semiconductor manufacturing is provided. The system comprises an external device and an associated controller configured to control the external device. The system further comprises a system controller programmed to control one or more lower level controllers including the associated controller; detect error condition signals from the associated controller; automatically transmit diagnostic commands to the associated controller after detecting an error condition signal; and automatically retrieve diagnostic data after automatically transmitting the diagnostic commands.

BRIEF DESCRIPTION OF THE DRAWINGS

Non-limiting and non-exhaustive embodiments of the present invention are described with references to the following figures, wherein reference numerals refer to like parts throughout.

DETAILED DESCRIPTION OF SOME EMBODIMENTS

Figure 1:
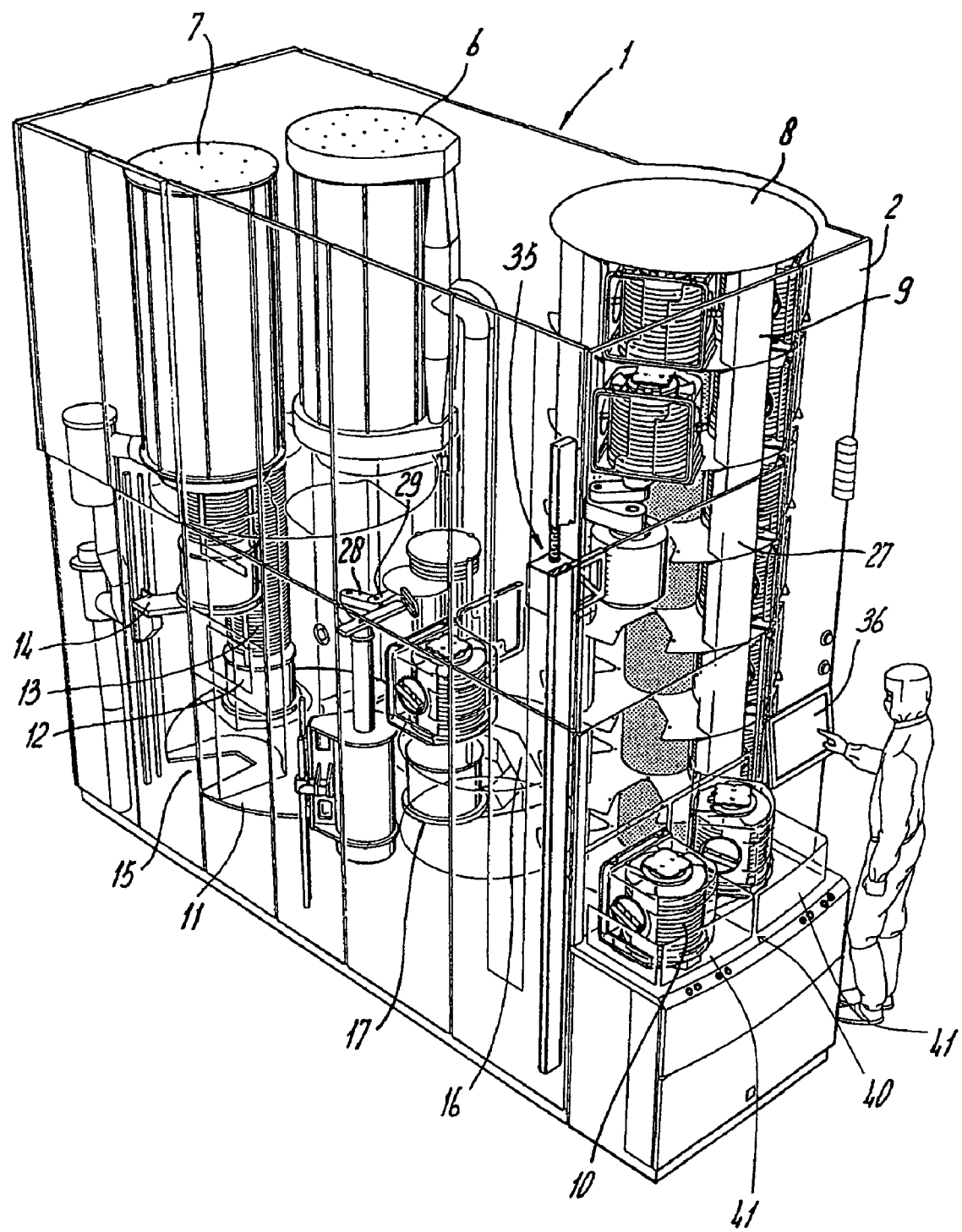
FIG. 1 is a perspective view of an exemplary process system used in semiconductor manufacturing in accordance with some embodiments of the invention.

Embodiments of the invention provide systems and methods for automatically performing diagnostic functions and gathering diagnostic data in response to error conditions in an industrial apparatus, such as in a process system for manufacturing semiconductors. Advantageously, the system makes typical manual diagnosis by a field services engineer using a laptop unnecessary. It has been found that manual diagnosis by a field services engineer consumes considerable time, is prone to human error, is constrained by clean room restrictions, and risks losing data that is useful in diagnosing error conditions. Methods and systems of the present invention include performing automated customizable error diagnostics (ACED), which eliminates several of the problems associated with manual error diagnosis by a field service engineer. These methods and systems can be used in any of a number of systems in which external devices are used in a process system for manufacturing semiconductors.

In order to resolve problems associated with manual error diagnostics, one option is to program error diagnostics into software of the system controller, which are fixed components of the process tool. Variables that could be important for diagnostics of an error condition could be logged continuously. However, this would result in an enormous amount of data that is difficult to handle and that would make the controllers involved impractically slow. Normal operation and diagnostics are usually incompatible as they have opposing requirements: fast responses for normal operation and complete information for diagnostics. Furthermore, it is difficult to anticipate in advance all the error conditions that might arise and the diagnostics needed for adequate diagnosis. If at some future time an unexpected error arises and/or additional diagnostics appear desirable, the software would need to be amended and would require a new release. In practical situations with many industrial apparatuses in the field, this may be logistically difficult and can become unworkable.

According to some embodiments of the invention, automated customizable error diagnostics (ACED) functionality is provided to a high level controller, such as a system controller, to which a lower level controller is connected. In some embodiments of the invention, this lower level controller is an external device controller for controlling an external device. The higher level controller monitors for specific error conditions in the external device, e.g., through the external device controller. Upon occurrence of an error condition, first the error diagnostics function is executed, with the purpose of collecting data from the lower level controller about the error condition before the error condition is set and the system stops. The error diagnostics function comprises a list of possible errors, and for each error a specific Diagnostic Command List to be executed is provided. In some embodiments, an editor is provided in a system controller for editing and customizing the Diagnostic Command Lists. In addition, in some embodiments, the data collected by the diagnostics functionality can be viewed in a viewer.

Reference will now be made to the Figures, in which like numerals refer to like parts throughout.

It will be appreciated that embodiments of the invention have application to various industrial apparatus known in the art. By way of example only, the process system illustrated in FIGS. 1 and 2 is one system which can incorporate ACED functionality.

Figure 2:
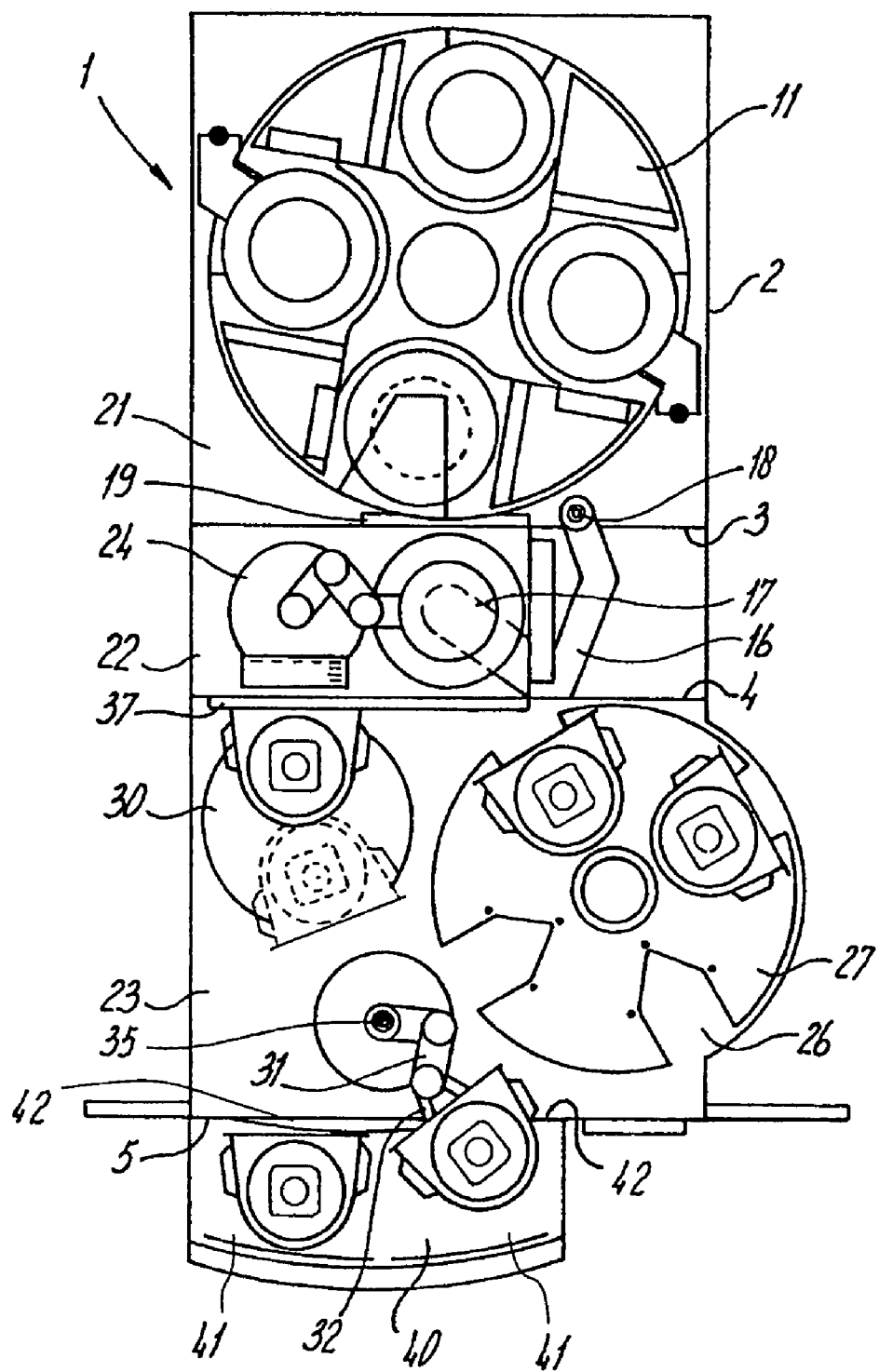
FIG. 2 is a schematic top plan view of the exemplary process system of FIG. 1 in accordance with some embodiments of the invention.

FIG. 1 shows, diagrammatically and partially exposed, a perspective view and FIG. 2 shows a plan view of a wafer processing system for processing, e.g., 300-mm wafers supplied in 300-mm FOUP cassettes. The wafer processing system is indicated in its entirety by reference numeral 1. This system 1 comprises a housing 2 and is generally installed in a so-called "clean room." In addition to the housing 2, partitions 3, 4 and 5 are also present. The housing 2 delimits, with the partition 3, a processing area or chamber 21. In this example, the processing area 21 comprises vertical furnaces 6, 7. The housing 2 and the partitions 3 and 4 define a wafer handling chamber or station 22. A cassette transfer chamber 23 is defined within the housing 2 between partitions 4 and 5.

An input/output station 40 for transferring cassettes 10 into and out of the system 1, is disposed adjacent to and in front of the cassette transfer chamber 23. The input/output station 40 can also be referred to as a front end, as it is located at a front, or entrance to, the processing system 1. The input/output station 40 includes two input/output ports 41, each port comprising a platform to support a cassette and a closeable opening 42 which allow cassettes 10 access into the interior of the housing 2. The cassettes can be, e.g., a 300-mm FOUP cassette, for holding 300-mm substrates, or a 200-mm open cassette, for holding 200-mm substrates. The system 1 is preferably provided with a tool set which allows it to interface with either 300-mm FOUP cassettes or 200-mm open cassettes. Such a tool set is described in U.S. Pat. No. 6,632,068, the entire disclosure of which is incorporated herein by reference.

Wafers 13 are supplied in cassettes 10, which are placed on the input/output station, or system front-end, 40 from the clean room side. The cassettes are placed coplanar, the side from which the wafers can be removed being substantially parallel with the partition 5 and facing the closeable openings 42. Then the cassettes are rotated so that the side from which the wafers can be removed is oriented perpendicular to a radial extension direction of a cassette handling robot or device 31. In FIGS. 1 and 2 the cassette on the right input/output position is shown in such a rotated orientation and the cassette on the left input/output position is shown in a coplanar orientation. Then the cassette handling device 31 within the cassette transfer chamber 23 grips and transfers the cassettes 10 from the input/output station 40 through the closeable opening 42 into a cassette store 8 located in the cassette transfer chamber 23. The cassette store 8 is provided with a number of rotary platforms 27 above one another, on which the cassettes 10 are stored. The cassette handling device 31 is movable in a vertical direction by means of an elevator 35 so that the different platforms 27 can be reached. The cassette handling device 31 is provided with a cassette end effector 32, which has dimensions smaller than those of a series of cut-outs 26 in the rotary platforms 27. After the cassette handling device 31 has transferred a cassette 10 into the store 8, the end effector 32 can be lowered through one of the cut-outs 26 in one of the platforms 27 to place the cassette 10 on the platform 27. Subsequently, the cassette handler 31 can be retracted from cassette store 8. The cassette handling device 31 is mounted such that it is able to transfer cassettes between the input/output station 40 and the store 8. The device 31 is also capable of transferring cassettes between the store 8 and a rotatable cassette transfer platform 30, or between the input/output station 40 and the rotatable cassette transfer platform 30.

The rotatable cassette transfer platform 30 is constructed such that, on rotation, the cassette 10 is placed against the partition 4 between the cassette transfer chamber 23 and the wafer handling chamber 22. The partition 4 is provided with an openable closure and a closure mechanism, together forming an interface schematically indicated by reference numeral 37. The interface 37 is preferably configured for 300-mm FOUP cassettes. After placing the cassette 10 against the interface 37 in the partition 4, the closure mechanism grips and unlocks the closure of the FOUP cassette 10 and simultaneously opens the closure in the partition 4 and the closure of the FOUP cassette 10, thereby allowing a wafer handling robot or device 24 within the wafer handling chamber 22 to access substrates in the FOUP cassette 10.

The wafer handling device 24 transfers wafers between a cassette 10 and a wafer boat 12. After completion of the loading of wafers into the wafer boat 12, a boat transfer arm 16 moves the wafer boat 12 through a closeable opening in partition 3 from the wafer handling chamber 22 into the processing chamber 21. The processing chamber 21 is provided with a rotary boat transfer platform 11, supporting the wafer boat 12. Two reactors, which in this case comprise furnaces 6, 7, are arranged in the processing chamber 21. The furnaces 6, 7 are positioned vertically and wafer boats, indicated by 12, filled with wafers 13, are introduced into the furnaces 6, 7 in the vertical direction from below. To this end, each furnace 6, 7 has an insertion arm 14, which is movable in the vertical direction. Only one insertion arm 14 is illustrated in FIG. 1.

The treatment of a large number of wafers can be carried out as follows: The operator, shown diagrammatically in FIG. 1, loads the store 8 by introducing a number of cassettes 10 on the input/output station 40 and carrying out control operations on a control panel 36. The illustrated input/output station 40 has two input/output ports 41, each input/output port provided with a closeable opening 42, through which a cassette 10 can be received into the cassette transfer chamber 23. Each of the cassettes 10 is transferred from the input/output station 40, through a closeable opening, with the aid of the cassette handling device 31 into the storage compartments 9 made for these cassettes 10 in the store 8, specifically on the stacked rotary platforms 27. By rotation of the store 8 and use of the elevator 35, it is possible to fill various compartments with the cassettes 10. After filling the store 8, no further human interaction is required with this automated installation.

The cassettes 10 concerned are then removed from the store 8 by the cassette handling device 31 and placed on the cassette transfer platform 30. The cassette transfer platform 30 comprises two levels, schematically indicated in FIG. 1, each level capable of receiving a FOUP cassette 10, where the two levels can be rotated independently of one another. Upon rotation of the cassette transfer platform 30, the cassettes 10 are placed against partition 4. After opening of the closure of the FOUP cassette 10, together with the closure 37 in partition 4, the wafers are removed by the wafer handler 24 and placed in a wafer boat 12. After the wafer boat 12 has been filled, and becomes available for one of the reactors 6, 7, the closure 19 in partition 3 is opened and the wafer boat 12 is placed on the rotary boat transfer platform 11 by the boat transfer arm 16. The boat transfer platform 11 then moves the wafer boat 12 within the process chamber 21 to a position below the reactor to be loaded. Then the insertion mechanism or elevator 14 moves the boat into the reactor 6 or 7. Treated wafers execute a movement which is the reverse of the movement described above.

Although an operator is described as introducing the cassette 10 on the input/output station 40, the system is designed such that the cassettes 10 can alternatively be introduced on the input/output station by means of an automatic guided vehicle (AGV) or by an overhead hoist system. In such cases, the control system of the wafer processing system can be connected to a host computer system that carries out the control functions. In such arrangements, no human interaction at the wafer processing system is required.

The above-described system is available from ASM International N.V. as the ADVANCE® 400 Series of furnaces. In some embodiments of the invention, various controllers of the system include ACED programs and related apparatus. Exemplary controllers, which can include a Wafer Logistics Controller (WLC) and a Cassette Logistics Controller (CLC), are shown in FIG. 3.

Figure 3:
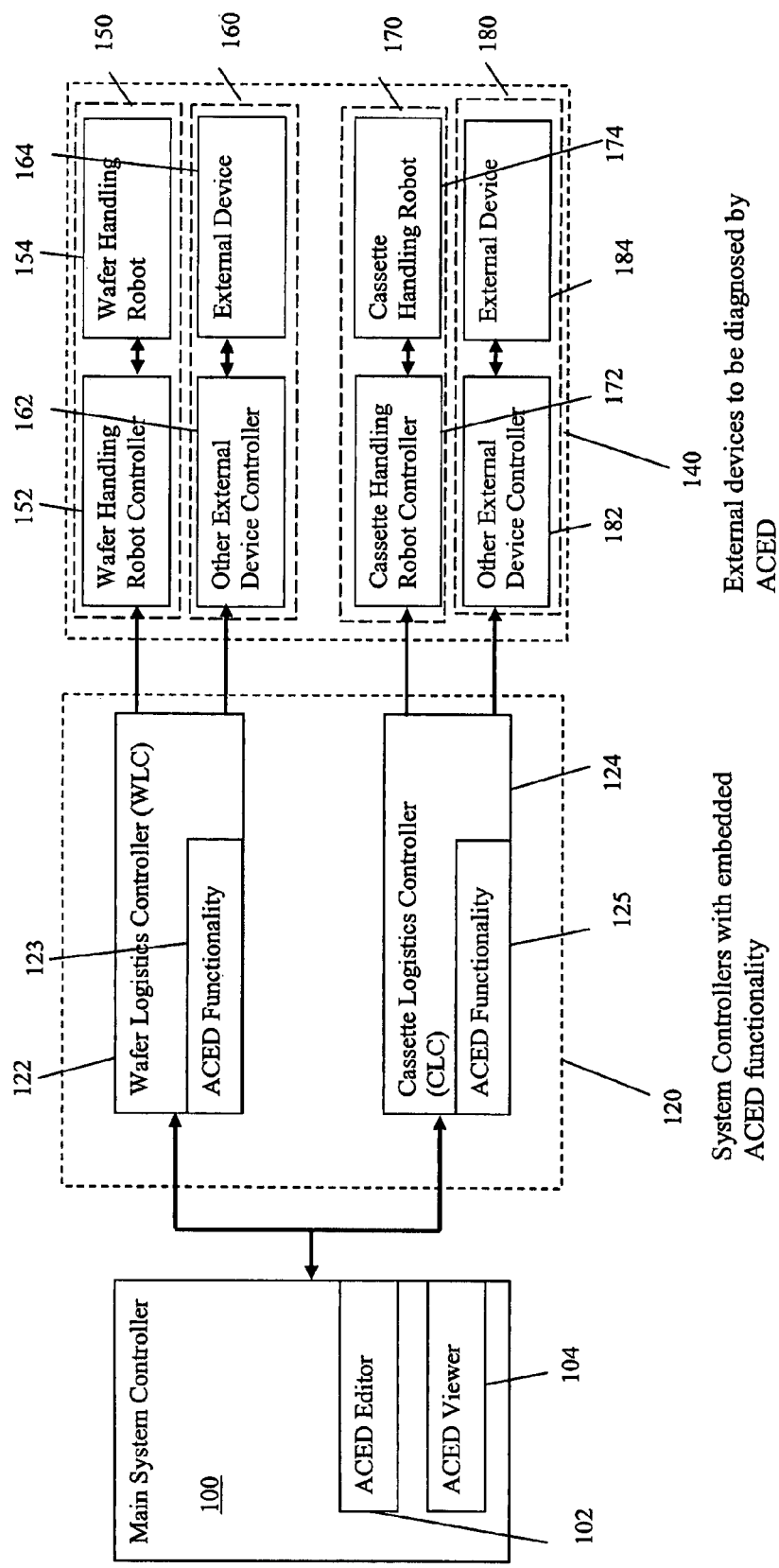
FIG. 3 schematically illustrates an exemplary control structure of an apparatus with external devices in accordance with some embodiments of the invention.

In FIG. 3, the Main System Controller 100 comprises an ACED editor 102 and an ACED viewer 104. The skilled artisan will appreciate that controllers can be implemented in hardware, software, firmware and combinations of the same. In the illustrated embodiment, the Main System Controller 100 is implemented as hardware on which software is installed, and particularly as a dedicated computer that forms a part of the processing system (e.g., an ADVANCE® 400 furnace), including custom software stored on a memory device of the computer for controlling, directly or indirectly, various components of the processing tool.

System controllers with embedded ACED functionality are indicated by reference numeral 120. The system controllers 120 of the illustrated embodiment are also implemented as hardware on which software is installed, in this case as a dedicated circuit board including a microprocessor, including memory device(s) storing custom software for indirectly controlling external devices by way of the external devices' own dedicated controllers.

A first example of such a system controller 120 is Wafer Logistics Controller 122 with embedded ACED functionality 123 and Cassette Logistics Controller 124 with embedded ACED functionality 125. The group of external devices to be diagnosed by ACED is indicated by reference numeral 140.

A first example of an external device is a Wafer Handling Robot System 150 comprising an associated Wafer Handling Robot Controller 152 and a Wafer Handling Robot 154. The Wafer Handling Robot ("WHR") Controller 152 of the illustrated embodiment comprises hardware in the form of a small dedicated computer, and includes software from the external device supplier for steering the WHR 154. An exemplary WHR System 150 is commercially available from Genmark Automation Inc. of Milpitas, Calif., U.S.A. under the model name Gencobot 4S (GB4S). It will be appreciated that the Wafer Handling Robot 154 can correspond to the wafer handler 54 of FIGS. 1 and 2. The WHR Controller 152 of the illustrated embodiment is hardwired to its WHR 154 by way of a number of cables, having a large number of conductors therein, though the skilled artisan will appreciate that other connections (e.g., wireless) may be employed in other embodiments. The WHR controller is also connected to the Wafer Logistics Controller 123 of the System Controllers 120. The Wafer Logistics Controller ("WLC") 123 can thus be said to indirectly control the WHR 154 through the WHR controller 152, while the WHR controller 152 directly controls the WHR 154.

One or more other external device systems 160 with external device controllers 162, controlling external devices 164, might be connected to WLC 122. Examples of such other external devices systems 160 connected to the WLC 122 include integrated metrology units, such as a particle counter or an ellipsometer, or a gas sensing system, each having its own dedicated external device controller 162. The skilled artisan will appreciate that the above examples of external device systems 160 will have functionality that interacts with that of the Wafer Handling Robot System 150, such that the WLC 122 coordinates instructions to the Wafer Handling Robot 154 and the external device 164.

A second example of a system controller with embedded ACED functionality is a Cassette Logistics Controller 124 with embedded ACED functionality 125.

The corresponding example of an external device is a Cassette Handling Robot System 170 comprising a Cassette Handling Robot Controller 172, controlling a Cassette Handling Robot 174. The Cassette Handling Robot Controller 172 of the illustrated embodiment comprises hardware in the form of a small dedicated computer, and includes software from the external device supplier for steering the Cassette Handling Robot 170. An exemplary Cassette Handling Robot System 170 is commercially available from Genmark Automation Inc. of Milpitas, Calif., U.S.A. under the model name Gencobot 4-CTR (GB4-CTR). It will be appreciated that the Cassette Handling Robot 174 corresponds to the cassette handler 61 illustrated in FIG. 2 in some embodiments. The Cassette Handling Robot Controller 172 of the illustrated embodiment of FIG. 3 is hardwired to its Cassette Handling Robot 174 by way of a number of cables, having a large number of conductors therein, though the skilled artisan will appreciate that other connections (e.g., wireless) may be employed in other embodiments. The Cassette Handling Robot Controller 172 is also connected to the Cassette Logistics Controller ("CLC") 124.

One or more other external device systems 180 with external device controllers 182 controlling external devices 184 might be connected to CLC 124. An example of other external device system 180 connected to the CLC 124 is a vision wafer counter as described in U.S. Pat. No. 7,015,492, assigned to the assignee of the present application, the entire disclosure of which is incorporated by reference herein. While this exemplary external device system 180 is not purchased from a third party supplier, but is rather manufactured by the assignee of the present application, the unit nevertheless is produced with a dedicated controller and is integrated in the same way as external devices purchased from third parties. The skilled artisan will appreciate that such a vision wafer counter has functionality that interacts with that of the Cassette Handling Robot System 170, such that the CLC 122 will be able to coordinate instructions to the Cassette Handling Robot 154 and the external device 164.

The system can also include additional system controllers, with or without ACED functionality, such as a temperature controller, a process controller, etc., which are not shown.

The ACED editor 102 can be used to create a list of commands that must be executed on occurrence of a particular error condition. One example of such an error condition is a motion error of an external device (e.g., a robot). In certain circumstances, a motion error results from making certain movements with too much friction at one point causing an over-current. Although over-current is generally the most frequently occurring cause for motion errors, other causes are possible. Thus, more information is typically needed to more specifically diagnose the error and implement a solution.

Figure 4:
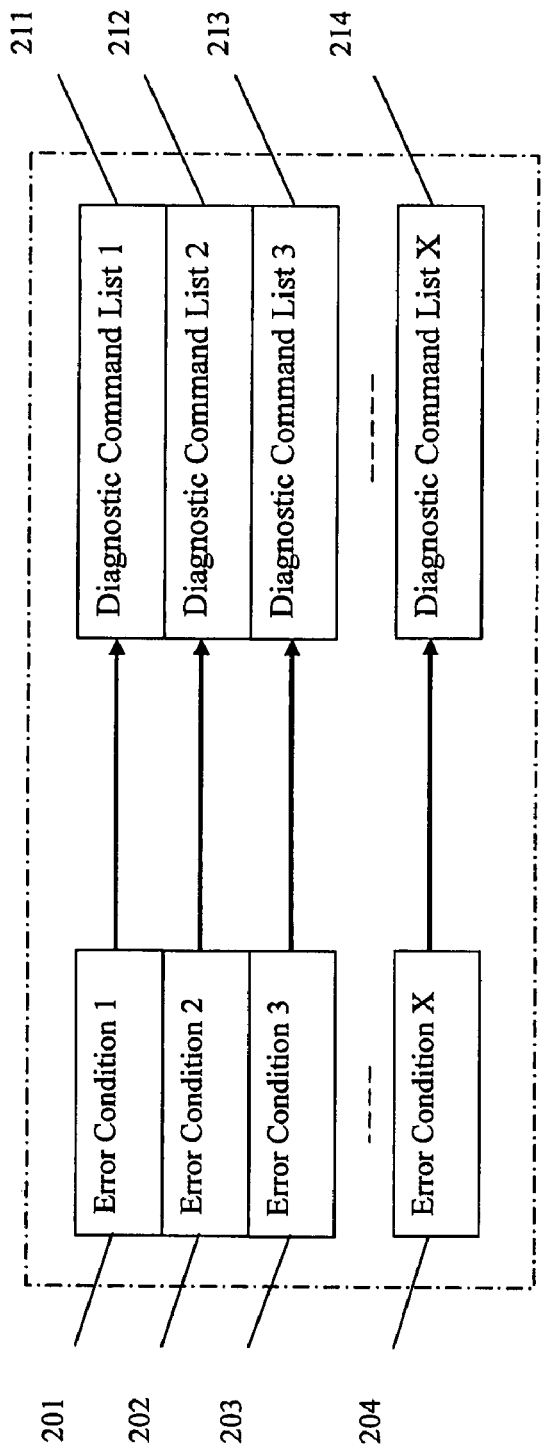
FIG. 4 shows various relationships between errors and diagnostic command lists in accordance with some embodiments of the invention.

As illustrated in FIG. 4, for adequate diagnostics a specific Diagnostic Command List 211 to 214, can be assigned to each one of the Error Conditions 201 to 204. One example of a diagnostic command is "diagnose motion error," which corresponds to a motion error. The motion error diagnostic gets the robot status, the robot's detailed or lower level status, and present position. For example, this will show that the robot has encountered an over-current situation and the robot is still in the assigned movement range, and the servos are disabled. In the case of over-current, the servos are automatically disabled to prevent eventual damage to the robot and/or an end-effector. Also, the status shows if a wafer is present on the end-effector.

The commands of such lists 211-214 can be commands requesting the values of a number of variables in the registers of a controller (e.g., 152, 162, 172, 182 of FIG. 3) of the external device. Each external device controller in general will have its own specific errors and Diagnostic Commands and each error in general will have a need for its own specific Diagnostic Command List. Typically, a set of default diagnostic commands is provided by the supplier of the external device. This set can be made available for use with the editor so that, when editing a Diagnostic Command List for a specific Error, a selection from this default set can be made. However, it regularly occurs that in case of special error conditions the supplier of the external device is able to provide additional specific commands that are also supported by the external device controller, in order to diagnose the specific error condition. In a preferred embodiment, the editor is capable of editing such specific commands. When the editing is complete, the table with the possible Errors and the corresponding Diagnostic Command List for each of the Errors is downloaded to the system controller 120 (FIG. 3) involved.

When an error condition is signaled in the system controller 120 (FIG. 3), the ACED diagnostics functionality 123, 125 will be executed before the system is stopped or brought to a standstill. The Diagnostic Command List 211-214 (FIG. 4) that corresponds to the error condition 201-204 which has occurred will be executed. The commands will be executed in the order specified in the Diagnostic Command List.

Figure 5:
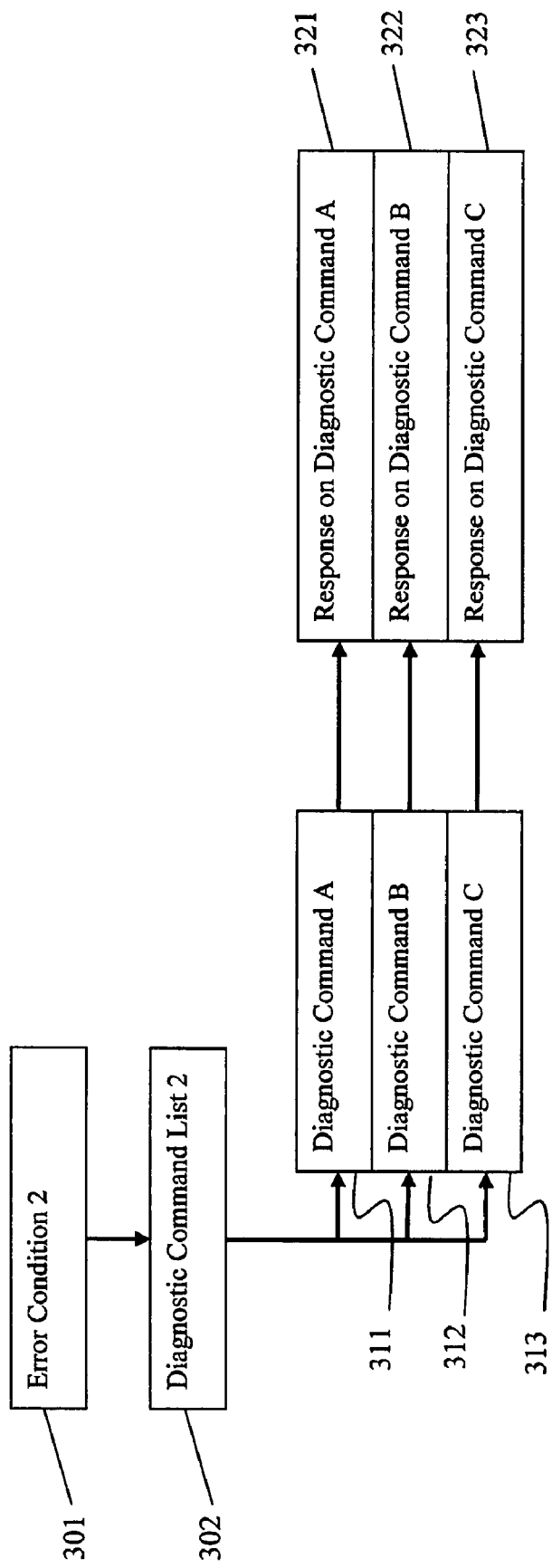
FIG. 5 schematically illustrates an example of an error condition, diagnostic commands and responses in accordance with some embodiments of the invention.

FIG. 5 illustrates an exemplary triggering of diagnostic commands. When Error Condition 2 (e.g., a motion error) occurs, represented by reference numeral 301, a corresponding Diagnostic Command List 2, represented by reference numeral 302, will be executed. In the illustrated example, Diagnostic Command List 2 (302) comprises Diagnostic Commands A, B and C (respectively indicated by reference numerals 311, 312 and 313). A diagnostic command could be, for example, a diagnose motion error. Upon execution of each of the Diagnostic Commands, causing signals to be sent to a concerned external device, a corresponding Response to Diagnostic Command A, B and C (represented by reference numerals 321, 322 and 323, respectively) is collected. The Responses to Diagnostic Commands received from the external device in response to the sent diagnostic command, are passed on to the Main System Controller. If a command is rejected by the external device controller for some unforeseen reason, this rejection is signaled to the Main System Controller. When the command is not rejected by the external device controller, it will be executed by the external device. If multiple error conditions are set at the same time, the Diagnostic Command Lists for all set error conditions will be executed by the external device(s) affected by the error conditions.

Referring back to FIG. 3, the ACED viewer 104 on the Main System Controller 100 gathers and stores all the data generated by the diagnostics functionality 123 in the system controller 122 and shows this data on the screen. If the user has enough data to remedy the situation, the diagnostics functionality 123 can be disabled. This user-controlled enabling/disabling of the diagnostics function can be performed irrespective of the state of other external device controllers. If not enough data is collected by the execution of the programmed error diagnostic commands, the list can simply be modified and expanded using ACED Editor 102 so that, when the error occurs again at a future time, adequate information is collected.

Figure 6:
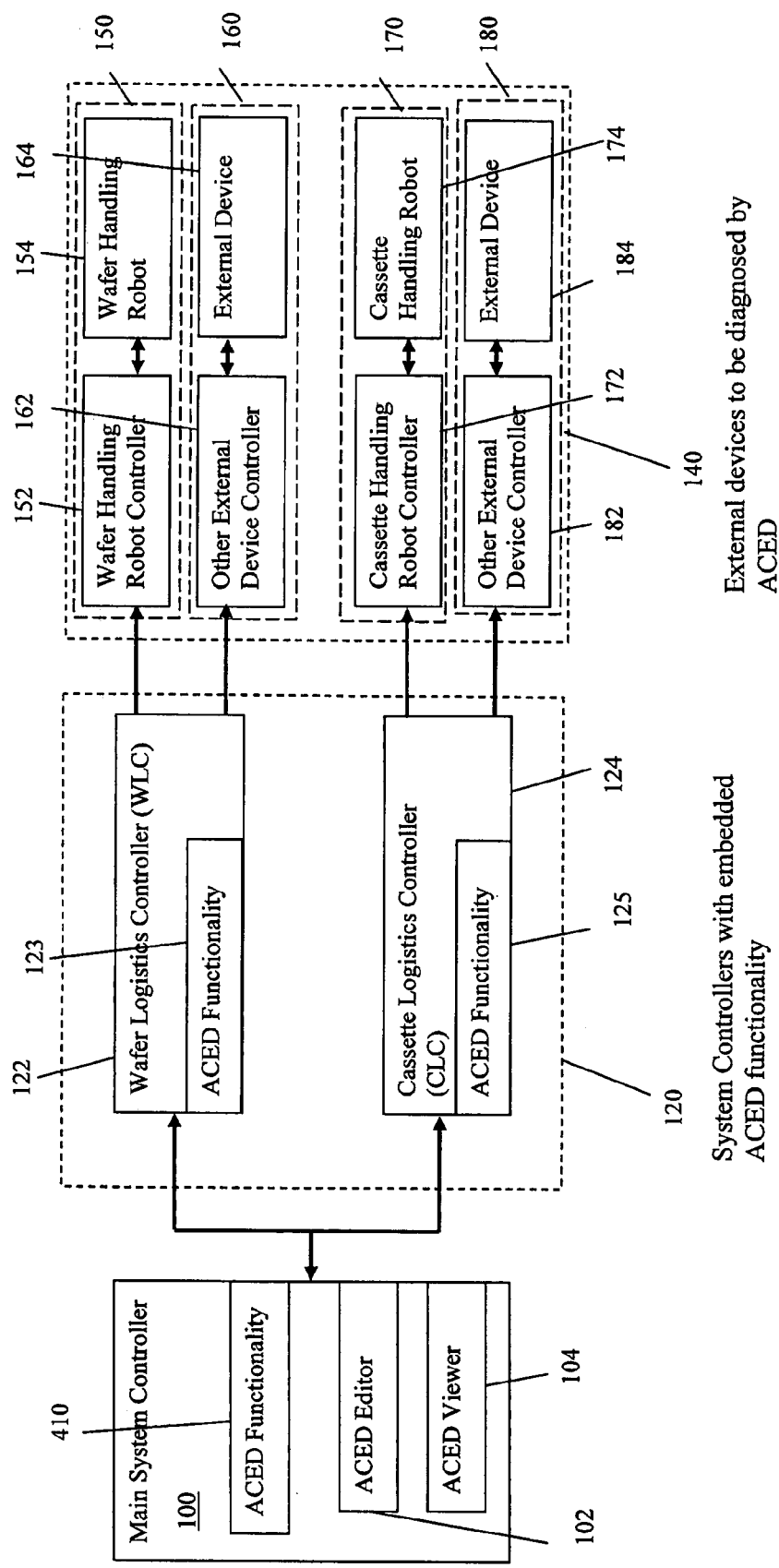
FIG. 6 schematically illustrates an exemplary control structure of an apparatus with external devices, the control structure provided with diagnostics functions at two levels in accordance with some embodiments of the invention.

With reference to FIG. 6, although the systems and methods described herein are advantageously applied to work with a system controller electrically connected to and controlling an external device having an external device controller, embodiments of the invention can beneficially be applied generally for diagnostics between two or more system controllers on different levels. For this purpose, the higher level controller of the system controllers also includes ACED functionality. In practical situations, there will often be a need to apply the method to multiple levels simultaneously, such as between a system controller and external device and between two system controllers of different levels. The skilled artisan will appreciate that the physical location of the ACED functionality is not limited to a particular level of a controller having that functionality.

As an example we take again the ADVANCE® 400 Series of furnaces, having the controller structure as pointed out in FIG. 6. This structure is similar to the structure shown in FIG. 3, wherein similar parts have identical reference numerals throughout. In FIG. 6, the Main System Controller (MSC) 100 now additionally comprises ACED functionality 410. In case an error of the Wafer Handling Robot is signaled to the Main System Controller 100, a list of relevant variables can be collected from both the wafer logistics controller (WLC) 122 and the Wafer Handling Robot Controller 152. A possible scenario is as follows:

The WLC 122 signals the MSC 100 with an error condition of the Wafer Handling Robot 154.

The WLC 122 stops other tasks that alter data. WLC 122 will not stop responding, but no additional logistics/wafer handling actions are performed prior to executing the error diagnostics.

The MSC 100, and particularly the ACED functionality 410 thereof, determines which Diagnostic Command List to execute.

The MSC 100 starts executing the Diagnostic Command List and collects the data from the WLC 122.

When data collection by MSC 100 is complete, the WLC 122, and particularly the ACED functionality 123 thereof, determines which Diagnostic Command List it needs to execute.

WLC 122 starts executing the Diagnostic Command List and collects data from the Wafer Handling Robot Controller 152.

When data gathering on both layers 100, 120 is done, the WLC 122 sets error and stops.

When WLC 122 has set error and has stopped, the entire system stops.

Thus, when an error condition occurs, the diagnostics functions are executed before the respective controllers continue with their normal routine of error handling. The normal routine of error handling is that a system is stopped in a safe way for technician assessment and action. Accordingly, data concerning the error condition can be gathered before it is lost, and in an automated fashion, aiding the reliability of diagnosis. For example, diagnostic data gathered for a robot with a motion error includes the status of the robot, the position of the robot and the status of the robot's servos, which may be automatically disabled in the case of an overcurrent.

In a further embodiment, automatic root cause indication can be performed using the data collected by the ACED software. Each time an error occurs and the diagnostics is performed, data is collected. By analysis of these data, certain root causes might be connected to certain values or combinations of values of the variables collected by the ACED software. This analysis might be performed jointly by a software engineer and a field service engineer, combining the knowledge of these two disciplines and storing the results of the analysis in the ACED software. When the error condition occurs again, the most likely root cause can be identified automatically based on the information from previous error conditions and presented in the viewer, or sent to the system log. This simplifies the job of the field service engineer that will analyze the error and determine the root cause. In this way the time needed to determine the root cause will be further decreased and so will the time that the tool is not available for production.

In yet a further embodiment, the ACED software can be extended by an auto-correcting expert system. Based on the information collected by the ACED software and the most likely root cause identified, a Command List representing a recovery strategy can be selected and executed. This can advantageously continue system operation after carrying out steps for system recovery without halting production on an error condition.

One example of a recovery function, corresponding to an over-current situation of a motion error, is to enable the servos of the robot and to home the robot, which includes reinitializing a coordinate system which is lost when the servos are disabled. When the robot is up and running again, a wafer is returned to a source location after which the wafer handling can be started again to continue normal operations.

For a number of different error conditions and root causes, a corresponding appropriate recovery strategy can be programmed and made available for automatic execution. After executing the recovery strategy some additional diagnostics can be performed. Depending on the values of the variables collected after recovery, the system can decide to stop and signal an error, or continue operation in normal fashion. Optionally, if the first chosen recovery strategy does not result in resolution of the error condition, a second and eventually a third recovery strategy can be selected and executed before signaling an alarm and stopping the system. If the expert system is able to resolve the error condition automatically, without need for human intervention, the mean time between failures of the system will be greatly increased and fewer field service engineers will be needed to keep a given number of tools in operation.

It will be appreciated by those skilled in the art that various omissions, additions and modifications may be made to the methods and apparatus described above without departing from the scope of the invention. All such modifications and changes are intended to fall within the scope of the invention, as defined by the appended claims.

I claim:

1. A method of semiconductor manufacturing, comprising:
   providing a reactor system having a system controller configured to control an external device controller, the external device controller configured to control an associated external device;
   monitoring for an error condition signal from the external device controller, the error condition signal indicative of the occurrence of an error condition in the external device;
   automatically transmitting instructions from the system controller to the external device controller to execute diagnostic functions corresponding to the error condition signal upon detection of the error condition signal, thereby gathering a data set from the external device corresponding to the error condition detected;
   automatically gathering the data set from the external device after transmitting the instructions and during execution of the diagnostic functions, wherein monitoring for the error condition signal is performed without the system controller gathering the data set from the external device; and
   subsequently automatically executing error handling routines,
   wherein, after an error condition is detected and before executing diagnostic functions, the external device controller stops the associated external device from performing tasks that alter data.

2. The method of claim 1, wherein the external device is selected from the group consisting of a wafer handling robot, a cassette handling robot, a metrology unit and a gas sensing system.

3. The method of claim 1, further comprising:
   providing a user-accessible diagnostic function editor; and
   editing lists of diagnostic functions executed on error conditions in response to user commands, wherein editing lists is before monitoring for the error condition.

4. The method of claim 1, further comprising:
   providing a user-accessible diagnostic data viewer for viewing the diagnostic data; and
   displaying the diagnostic data on the viewer.

5. The method of claim 1, further comprising:
   providing a main system controller configured to control the system controller;
   automatically transmitting instructions from the main system controller to the system controller to execute diagnostic functions corresponding to the error condition upon detection of the error condition; and
   automatically gathering diagnostic data from the system controller after transmitting the instructions.

6. The method of claim 5, further comprising one or more additional external devices, each additional external device having an additional associated external device controller, wherein the system controller is configured to control the external device controllers for the external device and the additional external devices.

7. The method of claim 6, further comprising one or more additional system controllers, wherein the main system controller is configured to control the system controller and the additional system controllers.

8. The method of claim 1, further comprising automatically identifying a cause of the error condition.

9. The method of claim 8, further comprising automatically carrying out steps for error recovery.

10. The method of claim 9, further comprising continuing operation of the reactor system after carrying out steps for error recovery, without halting the reactor system in response to the error condition.

11. A method for semiconductor manufacturing, comprising:
    providing a semiconductor process tool with an associated controller, the associated controller configured to control the process tool and programmed to detect an error condition in the process tool and execute error handling routines after detecting an error condition;
    providing a higher level controller in communication with the associated controller, the higher level controller configured to gather diagnostic data from the associated controller and to control the process tool by transmitting instructions to the associated controller;
    monitoring for an error condition in the process tool without the higher level controller gathering a set of diagnostic data for the error condition from the associated controller;
    providing diagnostic commands from the higher level controller to the associated controller after detecting the error condition in the process tool, wherein, after the error condition is detected and before providing diagnostic commands, the associated controller stops the semiconductor processing tool from performing tasks that alter data;
    collecting the set of diagnostic data from the associated controller after providing diagnostic commands; and
    subsequently executing the error handling routines.

12. The method of claim 11, wherein performing error handling routines comprises stopping the external device.

13. A reactor system for semiconductor manufacturing, comprising:
    an external device and an associated controller configured to control the external device; and
    a system controller programmed to:
      control one or more lower level controllers including the associated controller;
      detect error condition signals from the associated controller, the error condition signals indicative of the occurrence of error conditions in the external device;
      automatically transmit diagnostic commands to the associated controller after detecting an error condition signal; and
      automatically retrieve a set of diagnostic data for the error condition signal after automatically transmitting the diagnostic commands, wherein detection of the error condition signal occurs without the system controller gathering the set of diagnostic data from the associated controller,
    wherein, after the error condition is detected and before transmitting diagnostic functions, the external device controller is configured to stop the associated external device from performing tasks that alter data.

14. The system of claim 13, wherein the system controller further comprises an editor configured to edit and customize the diagnostic commands.

15. The system of claim 13, wherein the system controller further comprises a viewer configured to view the diagnostic data and the error condition signals.

16. The system of claim 13, wherein the associated controller is programmed to execute error handling routines.

17. The system of claim 16, wherein the system controller is programmed to gather data before the associated controller executes the error handling routines.

18. The system of claim 13, wherein the system controller is programmed to automatically identify a cause of the error conditions.

19. The system of claim 13, wherein the system controller is programmed to automatically provide instructions for system recovery to the external device based upon the diagnostic data.

20. The system of claim 13, comprising:
- a housing having a reactor within the housing, the housing separating the reactor system from a surrounding clean room;
- a front-end for loading substrate cassettes into the housing;
- a cassette transfer region within the housing and adjacent to the front-end;
- a wafer handling chamber within the housing and adjacent to the cassette transfer region, the wafer handling chamber provided with a robot for loading and unloading boats and separated from the cassette transfer region by a partition; and
- a processing area within the housing and adjacent to the wafer handling chamber, the processing area separated from the wafer handling chamber by a partition, wherein the reactor is disposed in the processing area.

21. The system of claim 20, further comprising a cassette interface in the partition separating the wafer handling chamber and the cassette transfer region, the cassette interface having a closable opening sized and shaped to mate with the closure of a FOUP cassette and to open the closure of the FOUP cassette.

22. The system of claim 21, wherein the external device is the wafer handling robot, the wafer handling robot disposed within the wafer handling chamber, the wafer handling robot configured to access substrates within cassettes through the opening of the interface.

23. The system of claim 22, further comprising a cassette store in the cassette transfer region.

24. The system of claim 23, wherein the store comprises a plurality of stacked rotary storage platforms, each platform divided into a plurality of storage compartments and defining cassette store positions.

25. The system of claim 24, further comprising a cassette handling robot configured to access and transfer cassettes to and from the store.

* * * * *